(12) United States Patent
Bouiller et al.

(10) Patent No.: US 7,619,331 B2
(45) Date of Patent: Nov. 17, 2009

(54) TURBOMACHINE WITH INTEGRAL GENERATOR/STARTER

(75) Inventors: Philippe Pierre Vincent Bouiller, Samoreau (FR); Anthony Lorand, Vernon (FR); Stephane Rousselin, Hericy (FR)

(73) Assignees: SNECMA, Paris (FR); Hispano-Suiza, Colombes (FR)

( * ) Notice: Subject to any disclaimer, the term of this patent is extended or adjusted under 35 U.S.C. 154(b) by 322 days.

(21) Appl. No.: 11/626,649

(22) Filed: Jan. 24, 2007

(65) Prior Publication Data

US 2007/0217905 A1 Sep. 20, 2007

(30) Foreign Application Priority Data

Jan. 24, 2006 (FR) .................................. 06 00617

(51) Int. Cl.
 *F01D 15/12* (2006.01)
 *H02K 9/00* (2006.01)

(52) U.S. Cl. ........................ 310/52; 310/71; 415/122.1; 415/170.1

(58) Field of Classification Search .................. 310/52, 310/71; 415/170.1
 See application file for complete search history.

(56) References Cited

U.S. PATENT DOCUMENTS

| | | | |
|---|---|---|---|
| 3,264,482 A | 8/1966 | Clark et al. | |
| 3,705,775 A | 12/1972 | Rioux | |
| 4,531,357 A | 7/1985 | Weber et al. | |
| 5,237,817 A | 8/1993 | Bornemisza et al. | |
| 6,606,864 B2 * | 8/2003 | MacKay | 60/773 |
| 6,644,033 B2 * | 11/2003 | Daggett | 60/787 |
| 6,794,788 B1 * | 9/2004 | Smith et al. | 310/254 |
| 6,982,506 B1 * | 1/2006 | Johnsen | 310/61 |
| 2004/0189108 A1 * | 9/2004 | Dooley | 310/52 |
| 2005/0089399 A1 * | 4/2005 | Bart et al. | 415/170.1 |
| 2005/0151431 A1 * | 7/2005 | Cronin et al. | 310/60 A |
| 2006/0016196 A1 * | 1/2006 | Epstein | 60/773 |

FOREIGN PATENT DOCUMENTS

| | | |
|---|---|---|
| EP | 1 659 267 A1 | 5/2006 |
| EP | 1 662 636 A2 | 5/2006 |
| WO | WO 2005/059316 A1 | 6/2005 |

* cited by examiner

*Primary Examiner*—Quyen Leung
*Assistant Examiner*—John K Kim
(74) *Attorney, Agent, or Firm*—Oblon, Spivak, McClelland, Maier & Neustadt, L.L.P.

(57) ABSTRACT

Turbomachine such as an aircraft turbojet comprising an electrical generator/starter (26) that can be mounted and dismounted by axial translation in an upstream enclosure (18) of the turbomachine between the low-pressure compressor and the high-pressure compressor, and couple to electrical cables (34) which extend inside the structural arms (12) of the intermediate casing (10) of the turbomachine.

10 Claims, 4 Drawing Sheets

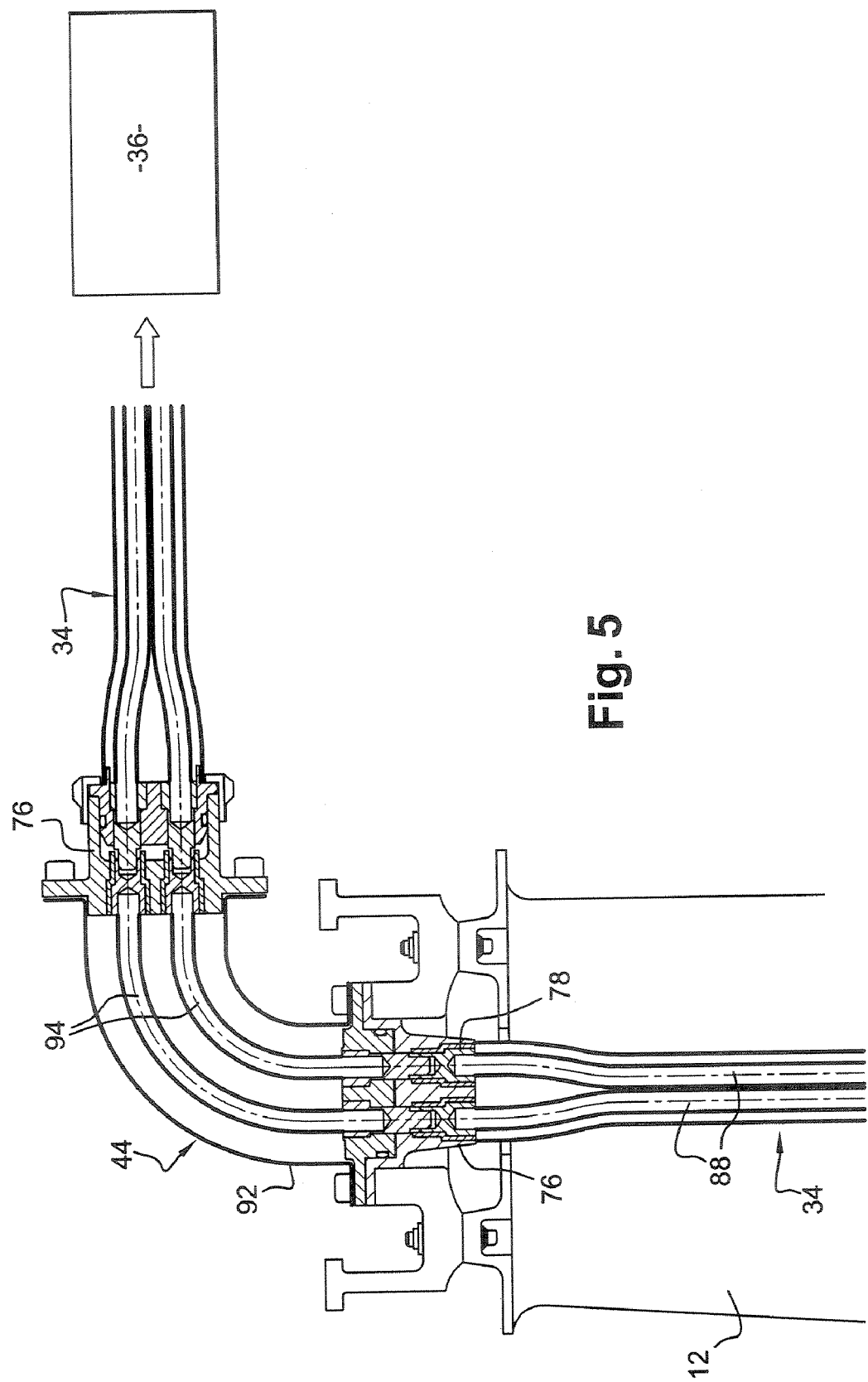

TURBOMACHINE WITH INTEGRAL GENERATOR/STARTER

The invention relates to a turbomachine, such as an aircraft turboprop or turbojet, equipped with an electrical generator forming a starter mounted axially in the turbomachine, and it also relates to a generator/starter for a turbomachine of this type.

In document EP-A-1 382 802 there is already proposed a turbomachine equipped with an integral generator/starter in which the generator/starter is mounted in the bore of one or two moving-blade discs of the compressor of the turbomachine.

The present invention is aimed in particular at improving this type of turbomachine by facilitating the mounting and dismounting of the integral generator/starter, in particular for maintenance purposes, and by simplifying its connections to electrical current supply or current distribution cables.

To this end it proposes a turbomachine comprising an electrical generator/starter whose rotor is driven by the shaft of a high-pressure compressor and whose stator is carried by an intermediate casing of the turbomachine, the generator/starter being disposed in an upstream enclosure of the turbomachine situated inside the intermediate casing between the low-pressure compressor and the high-pressure compressor, and comprises means of coupling to electrical cables extending inside structural arms of the intermediate casing.

The arrangement, according to the invention, of the generator/starter in the upstream enclosure of the turbomachine, between the low-pressure compressor and the high-pressure compressor, makes it possible to mount and dismount the generator/starter by axial translation from the upstream part of the turbomachine, thereby facilitating the maintenance operations and reducing their duration.

Moreover, this arrangement makes it possible to pass the electrical cables couple to the generator/starter along the inside of the structural arms of the intermediate casing, these cables being rigid and of relatively large cross section.

As this upstream enclosure of the turbomachine contains oil, the generator/starter accommodated in this enclosure is encased in a leaktight housing.

To facilitate the electrical connections of the generator/starter to the current supply/distribution cables, this leaktight housing is surrounded by a chamber delimited by the intermediate casing and by the housing and supplied with compressed air, this compressed air being able to enter the leaktight housing through inlet orifices made therein so as to establish in the housing an air overpressure opposing the entry of oil.

The leaktight housing furthermore comprises first means of coupling to the electrical cables passing along the inside of the arms of the intermediate casing, these first means of coupling passing leaktightly through a wall of the housing and extending inside the chamber supplied with compressed air.

These first means of coupling are couple outside the housing to second means of coupling which form a leaktight feedthrough through a wall of the chamber supplied with compressed air and which extend outside this chamber.

The couples between the first means of coupling carried by the leaktight housing and the second means of coupling are thus situated in the chamber supplied with compressed air and are protected from the oil contained in the upstream enclosure of the turbomachine.

Advantageously, the first means of coupling extend inside this chamber parallel to the axis of the rotor and are pushed onto the second means of coupling.

For example, the first means of coupling comprise, outside the housing, an axial female portion that can be pushed onto an axial male portion of the second means of coupling.

This allows blind mounting of generator/starter in the turbomachine, the electrical connections being effected automatically in the course of this mounting.

In a preferred embodiment of the invention, the leaktight housing of the generator/starter comprises an external cylindrical element forming a support of the stator of the generator/starter and carrying the first means of coupling, an internal cylindrical element forming the support of the rotor of the generator/starter, and upstream and downstream annular hoods fixed to the external cylindrical element at its ends and cooperating leaktightly with the internal cylindrical element by way of rotating seals.

The generator/starter according to the invention and its leaktight housing have a modular structure facilitating their mounting and their dismounting and making it possible moreover, for maintenance operations, to remove from the upstream enclosure the internal cylindrical element carrying the rotor of the generator/starter while leaving in place the external cylindrical element carrying the stator of the generator/starter.

The invention also proposes a generator/starter of the type described hereinabove for a turbomachine, this generator/starter being one which comprises a leaktight housing consisting of: an external cylindrical element forming a stator support; an internal cylindrical element coaxial with the external cylindrical element forming a rotor support; and annular hoods fixed to the axial ends of the external cylindrical element and cooperating with the internal cylindrical element via rotating seals.

Bent means of coupling to electrical cables are carried by the external cylindrical element of the housing and emerge axially outside the latter.

The external cylindrical element of the housing comprises an annular shell for fixing to an intermediate casing of the turbomachine, and the internal cylindrical element of this housing comprises an annular flange for fixing to a rotational drive shaft.

In this generator/starter, the internal cylindrical element comprises means of support for permanent magnets and the external cylindrical element comprises means of support for coils.

These two cylindrical elements are provided with channels for circulation of cooling oil.

The invention will be better understood and other characteristics, details and advantages thereof will become more clearly apparent on reading the description which follows, given by way of example with reference to the appended drawings in which.

Figure 1:
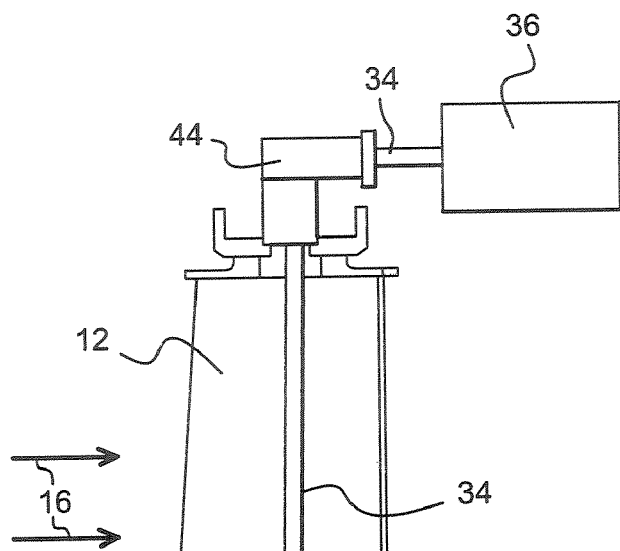
FIG. 1 is a partial diagrammatic half-view in axial section of a turbomachine according to the invention.
Figure 1:
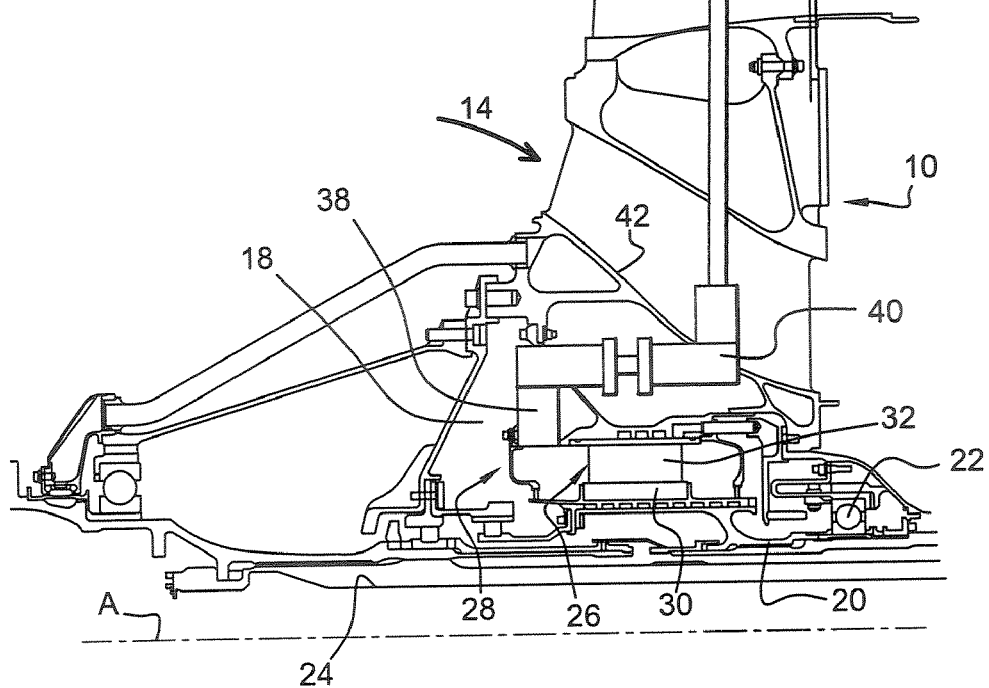

FIG. 5 diagrammatically represents means of electrical connection of the generator/starter to electronic power circuits;

Represented diagrammatically in FIG. 1 is an intermediate casing 10 of a turbomachine such as a turbofan, this intermediate casing being located between a low-pressure compressor situated upstream and associated with a fan, and a high-pressure compressor situated downstream and supplying a combustion chamber of the turbomachine.

The intermediate casing 10 comprises structural arms 12 which extend radially through the primary stream 14 and through the secondary stream 16 and whose external ends support the fan nacelle of the turbomachine.

The intermediate casing 10 delimits internally an upstream enclosure 18 in which are accommodated the upstream end of the shaft 20 of the high-pressure compressor and a bearing 22 for guiding this shaft, the enclosure 18 being traversed axially by the shaft 24 of the turbine, whose upstream part constitutes the drive shaft of the low-pressure compressor of the turbomachine.

An electrical generator 26 that can also operate as a starter is accommodated in a leaktight housing 28 inside the enclosure 18 and comprises a rotor 30 driven by the shaft 20 of the high-pressure compressor and a stator 32 carried by the intermediate casing 10, the rotor 30 comprising permanent magnets which rotate inside electrical coils forming part of the stator 32.

These coils are couple to electrical conductors 34 for distributing current (when operating as a generator) and for supplying current (when operating as a starter) and which are accommodated in the structural arms 12 of the intermediate casing 10. These conductors couple the generator/starter 26 to electronic power circuits 36 mounted inside the nacelle of the fan, downstream of the intermediate casing 10.

The electrical conductors 34 are rigid cables of relatively sizeable cross section (for example around 50 mm$^2$) which it is very difficult or impossible to curve and which follow rectilinear paths in the structural arms 12 of the intermediate casing. These conductors 34 are couple to the generator/starter 26 and to the electronic circuit 36 by way of bent means of coupling, comprising first means of coupling 38 carried by the leaktight housing 28 of the generator/starter 26, second means of coupling 40 carried by an annular wall 42 of the intermediate casing delimiting internally the core of the primary stream 14 and surrounding externally the upstream enclosure 18, and third means of coupling 44 carried by the external ends of the structural arms 12.

In an exemplary embodiment, three sets of first, second and third means of coupling, 38, 40 and 44, are provided for coupling the generator/starter 26 to the electronic circuits 36, these three sets being distributed at 90° to one another about the axis A of the turbomachine, and the third means 44 of coupling each being couple by conductors 34 of the aforesaid type to the electronic power circuits 36.

Figure 2:
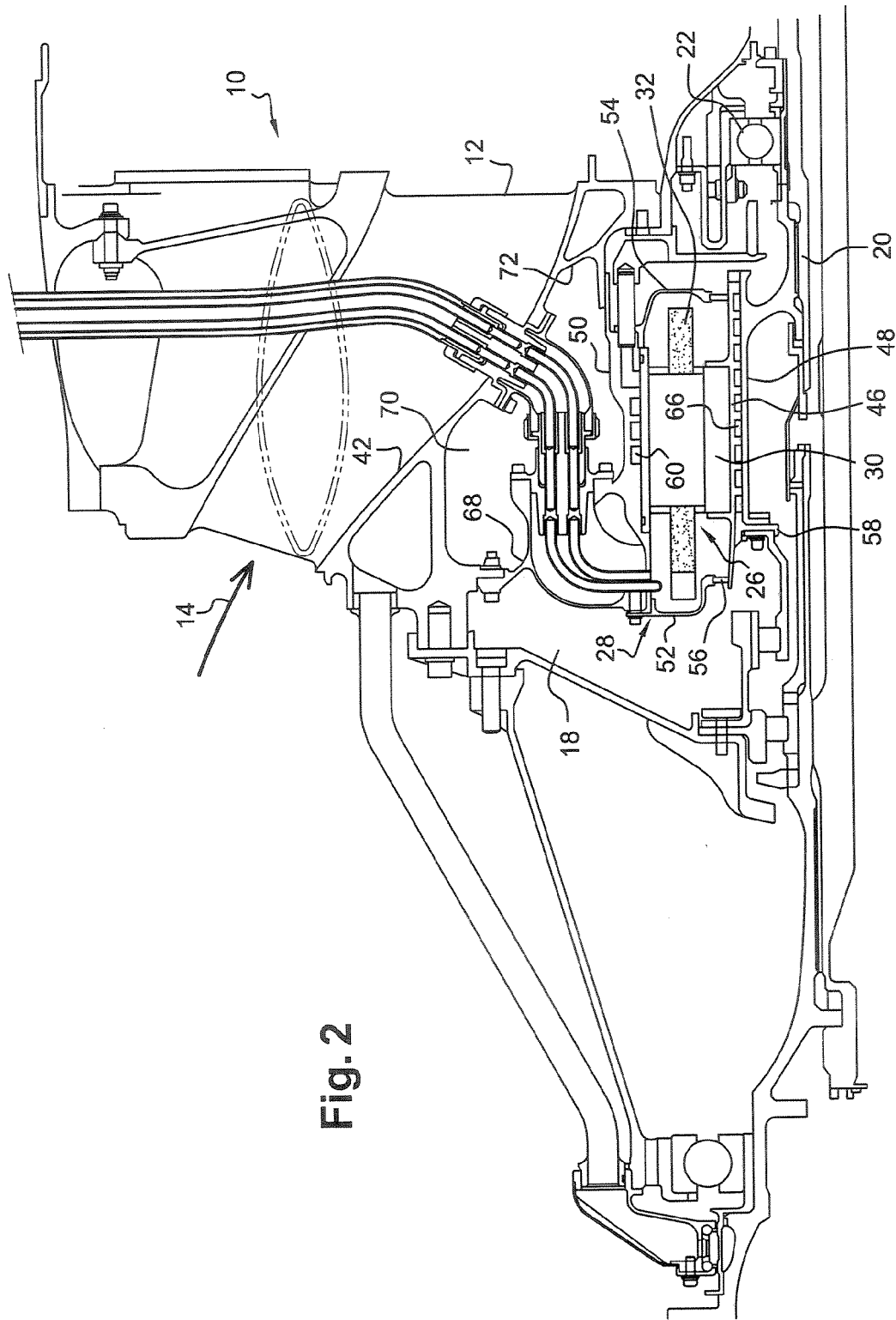
FIG. 2 is a diagrammatic half-view in axial section, on a larger scale, of the generator/starter mounted in the upstream enclosure of the turbomachine.

As may be seen better in FIG. 2, the housing 28 of the generator/starter 26 comprises an internal cylindrical element 46 which carries the permanent magnets constituting the rotor 30 of the generator/starter and which is mounted in axial translation on a support shaft 48 carried by the upstream end of the shaft 20 of the high-pressure compressor, the housing 28 also comprising an external cylindrical element 50, coaxial with the internal cylindrical element 46 and carrying the stator 32 of the generator/starter, and upstream 52 and downstream 54 annular hoods which are fixed to the axial ends of the external cylindrical element 50 and which cooperate leaktightly via rotating seals 56 with the axial ends of the internal cylindrical element 46.

The upstream end of the internal cylindrical element 46 comprises an internal annular flange 58 for fixing, by means of screws, to the support shaft 48 secured to the shaft 20 of the high-pressure compressor. The upstream annular hood 52 is fixed by screws accessible from upstream to the upstream end of the external cylindrical element 50 of the housing 28.

Channels 60 for circulating cooling oil are formed in the external element 50 and supplied with oil at their upstream end by a duct coupled to an oil feed pipe passing into the enclosure 18. At their downstream end, these channels 60 are linked to the lubrication circuit of the upstream bearing 22 for guiding the shaft 20.

Channels 66 for circulating cooling oil are also formed in the internal cylindrical element 46 and emerge at their downstream end into the enclosure 18, on the bearing 22 side.

The external cylindrical element 50 of the housing 28 comprises an external annular shell 68 for fixing by means of screws to the annular wall 42 of the intermediate casing 10, this annular shell delimiting about the external cylindrical element 50 a chamber 70 closed on the downstream side by an annular shell 72 dependent on the annular wall 42 of the intermediate casing, this annular shell 72 being terminated at its internal periphery by a cylindrical span in which the downstream end of the internal cylindrical element 50 of the housing 28 is leaktightly engaged.

The chamber 70 which surrounds the external cylindrical element 50 is supplied with compressed air from the primary stream 14 by orifices of the annular wall 42 which emerge into the chamber 70. Passages formed in the external cylindrical element 50 emerge inside the housing 28 and feed the compressed air inside this housing around the generator/starter 26 to prevent any entry of oil into the housing 28 from the upstream enclosure 18 of the turbomachine.

Figure 3:
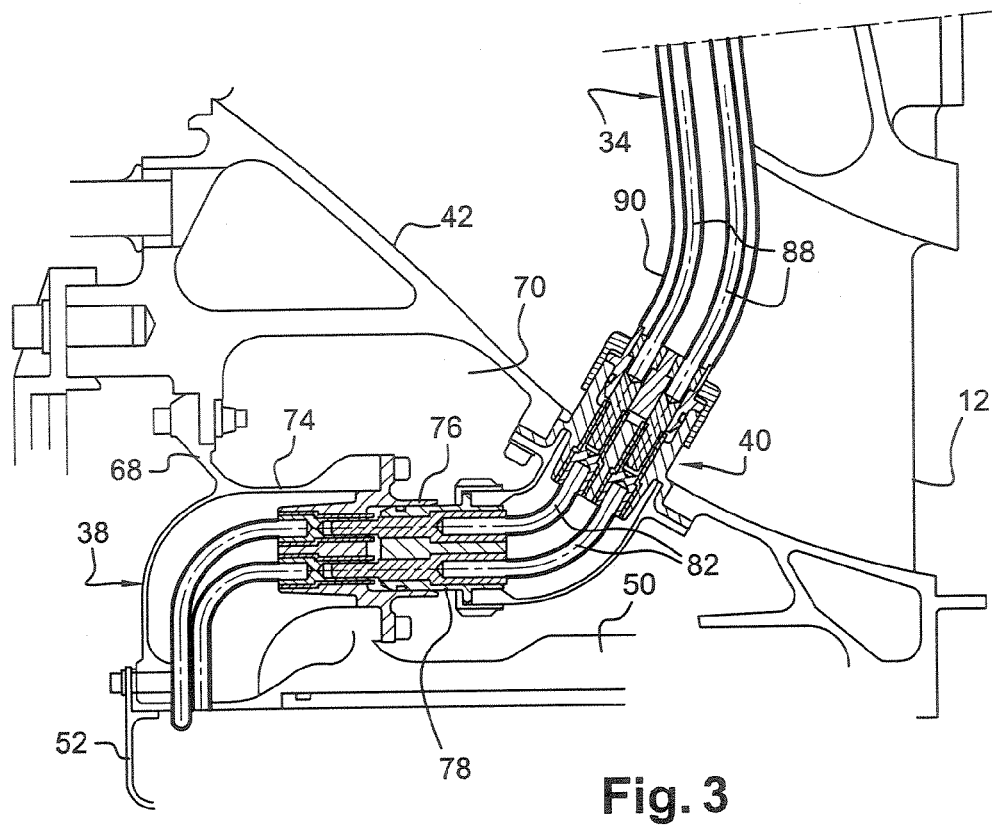
FIG. 3 is an enlarged view illustrating means of electrical coupling of this generator/starter.
Figure 4:
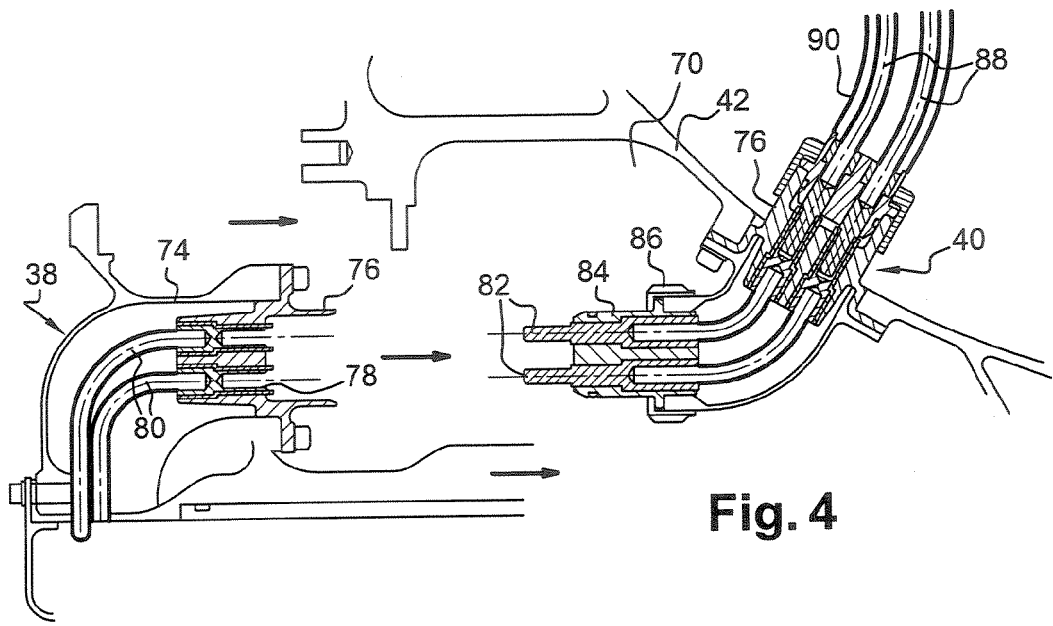
FIG. 4 represents these means of coupling in the unplugged state.

As may be seen better in FIGS. 3 and 4, the first means 38 of coupling carried by the leaktight housing 28 and the second means 40 of coupling carried by the annular wall 42 of the intermediate casing, emerge into the chamber 70 in such a way as to avoid any pollution of the electrical connections between these means of coupling by the oil contained in the enclosure 18.

More precisely, the first means of coupling 38 comprise a 90° bent duct 74, secured to the external cylindrical element 50 of the housing 28, this bent duct 74 emerging inside the housing 28 via its radially internal end and being closed at its radially external end by a connector 76 forming a female portion fixed by screws to the external end of the duct 74.

In the example represented, the connector 76 comprises a base made of dielectric material, in which are mounted three tubular conductors 78 which, at their upstream end, receive three conductors 80 linked to the coils of the stator of the generator/starter and which, at their downstream end, are intended to receive pins 82 mounted in a base 84 made of dielectric material of a male connector 86 forming part of the second means 40 of coupling.

The conductors 78 of the female portion of the first means of coupling 38 extend parallel to the axis of the generator/starter 26, as well as the pins 82 of the male portion of the second means of coupling, and are aligned axially with these pins. The base 84 of the male portion of the second means of coupling 40 is dimensioned so as to fit leaktightly into the female base 76 of the first means of coupling 38. Thus, when the external cylindrical element 50 carrying the first means of coupling 38 is put in place by axial translation from upstream to downstream, the female base 76 engages directly on the male base 84 and the connectors 76 and 86 are automatically coupled to one another, the pins 82 being engaged in the tubular conductors 78 of the connector 76.

Conversely, on dismounting the generator/starter 26, the axial translation from downstream to upstream of the external cylindrical element 50 is converted automatically into the separation of the connectors 76 and 84, as represented in FIG. 4.

The second means of coupling 40 are carried by the annular wall 42 of the intermediate casing 10 and pass leaktightly through this wall. They consist essentially of the male connector 86 described previously which extends from the wall 42 inside the chamber 70 and of a female connector 76 identical to that of the first means of coupling 38 and which extends outside the annular wall 42 in the core of the primary stream 14. The two connectors 86 and 76 of the second means of coupling 40 are joined by their external annular flanges which are fixed by screws to the annular wall 42 of the intermediate casing from the chamber 70.

The tubular conductors 78 of the connector 76 of the second means of coupling 40 receive rigid conductors 88, three in number, which are accommodated in a screening sheath 90 and which extend radially outward inside the arm 12 of the intermediate casing.

At their radially external end, these conductors 88 are linked (FIG. 5) by the third means of coupling 44 and conductors 34 to the electronic power circuits 36 represented in FIG. 1.

The third means of coupling 44 comprise a 90° bent duct 92 at the ends of which are mounted female connectors 76 of the type described previously, linked together inside the duct 92 by conductors 94.

For the mounting of the generator/starter, the following is carried out:
the shaft 48 supporting the rotor of the generator/starter is first of all put in place and mounted on the shaft of the high-pressure compressor of the turbomachine,
next, the external cylindrical element 50 equipped with the downstream hood 54 is put in place by axial translation from upstream to downstream, and is fixed to the intermediate casing by its external annular shell 68. The electrical connection between the first and the second means of coupling 38, 40 is done automatically, as is the connecting of the oil supply of the bearing 22,
the connecting of the means of oil supply of the channels 60 of the external cylindrical element 50 is carried out next,
next, the internal cylindrical element 46 carrying the rotor 30 of the generator/starter is put in place by axial translation from upstream to downstream and its annular flange 58 is fixed by screws or bolts to the support shaft 48,
next the upstream hood 52 is put in place and it is fixed by means of screws to the external cylindrical element 50.

The generator/starter according to the invention has a certain number of advantages:
its modular structure facilitates its mounting and its dismounting in the turbomachine,
the stator of the generator/starter, carried by the external cylindrical element 50, can remain fixed to the intermediate casing when dismounting the shaft of the high-pressure compressor during maintenance operations,
the means of electrical coupling of the generator/starter are located in a compressed air enclosure outside the upstream enclosure 18 of the turbomachine,
the electrical connection cables 34 are protected inside structural arms 12 of the intermediate casing,
the means of coupling 38, 40, 42 are preassembled and leaktight and allow the use of screened, rigid and straight conductors or cables, that do not need to be bent,
the electrical connections between the first and the second means of coupling 38, 40 are done blind in a safe manner by axial translation.

The invention claimed is:

1. A turbomachine comprising:
an intermediate casing between a low-pressure compressor and a high-pressure compressor;
an electrical generator/starter including a rotor driven by a shaft of the high-pressure compressor around a longitudinal axis of said turbomachine, said electrical generator/starter including a stator carried by said intermediate casing
an annular housing that houses said electrical generator/starter, said annular housing being mounted around the longitudinal axis of said turbomachine in an upstream enclosure of the turbomachine, said upstream enclosure being situated inside the intermediate casing and containing oil, the annular housing of the generator/starter being supplied with compressed air from said low-pressure compressor, wherein the annular housing comprises a first connector that couples said housing to electrical cables mounted in structural arms of the intermediate casing, said first connector being leaktight and extending inside a chamber delimited by the housing and by the intermediate casing and supplied with said compressed air from said low-pressure compressor, and
wherein said annular housing comprises a rotating housing element coupled to said rotor of said electrical generator/starter and being driven by said shaft of said high-pressure compressor around said longitudinal axis of said turbomachine,
wherein said annular housing further comprises stationary housing element coupled to said stator of said electrical generator/starter and to said intermediate casing, and
wherein said rotating housing element and said stationary housing element being coupled to each other via rotating seals so as to form said annular housing.

2. The turbomachine as claimed in claim 1, wherein the first connector connects outside the annular housing to a second connector which passes leaktightly through the wall of the chamber supplied with the compressed air and which extends outside said chamber into structural arms of the intermediate casing.

3. The turbomachine as claimed in claim 2, wherein the first connector extends inside the chamber parallel to the axis of the rotor and is pushed axially onto the second connector.

4. The turbomachine as claimed in claim 3, wherein the first connector comprises outside the annular housing, a connector with an axial female portion that can be pushed onto an axial male portion of a the second connector.

5. The turbomachine as claimed in claim 2, wherein the first and the second connectors are bent.

6. The turbomachine as claimed in claim 1, wherein the stationary housing element of the annular housing comprises an external cylindrical element forming a support of the stator of the generator/starter and carrying the first connector, wherein the rotating housing element of the annular housing comprises an internal cylindrical element forming the support of the rotor of the generator/starter, and wherein the annular housing further comprises upstream and downstream annular hoods fixed to the external cylindrical element at its ends and cooperating leaktightly with the internal cylindrical element by way of said rotating seals.

7. The turbomachine as claimed in claim 6, wherein the external cylindrical element of the housing comprises an annular shell for fixing to the intermediate casing and can be mounted and dismounted by axial translation from the upstream part of the enclosure.

8. The turbomachine as claimed in claim 6, wherein the internal cylindrical element is fixed at its upstream end to a support shaft driven by the shaft of the high-pressure compressor and can be mounted on and dismounted from this shaft by axial translation from the upstream part of the enclosure.

9. The turbomachine as claimed in claim 6, wherein the internal and external cylindrical elements of the housing are cooled by oil circulation.

10. The turbomachine as claimed in claim 1, wherein the annular housing comprises several first connectors, pushed axially onto several second connectors carried by the intermediate casing and couple by cables, and third connectors carried by the intermediate casing to electronic power circuits.

* * * * *